United States Patent

Michael et al.

[11] Patent Number: 6,046,673
[45] Date of Patent: Apr. 4, 2000

[54] SELECTING ARRANGEMENT HAVING A DISPLAY DEVICE

[75] Inventors: Joerg Michael, Ingolstadt; Rudolf Ehrmaier, Munich; Josef Neuner, Raubling, all of Germany

[73] Assignee: Bayerische Motoren Werke Aktiengesellschaft, Munich, Germany

[21] Appl. No.: 09/056,638

[22] Filed: Apr. 8, 1998

[30] Foreign Application Priority Data

Apr. 8, 1997 [DE] Germany .................. 197 14 495

[51] Int. Cl.⁷ .................................................. B60Q 1/00
[52] U.S. Cl. ................ 340/456; 340/461; 200/61.88; 74/335
[58] Field of Search .................. 340/456, 465, 340/461, 438; 74/335, 336, 337, 475; 200/61.88

[56] References Cited

U.S. PATENT DOCUMENTS

| | | | |
|---|---|---|---|
| 5,286,024 | 2/1994 | Winblad | 273/148 B |
| 5,584,209 | 12/1996 | Issa | 74/335 |
| 5,636,120 | 6/1997 | Yesel et al. | 74/335 |
| 5,675,315 | 10/1997 | Issa et al. | 340/456 |
| 5,741,202 | 4/1998 | Huber | 74/336 |

FOREIGN PATENT DOCUMENTS

| | | | |
|---|---|---|---|
| 0 361 011 | 4/1990 | European Pat. Off. | 340/456 |
| 33 37 930 | 7/1984 | Germany | 340/456 |
| 38 32 970 | 4/1990 | Germany | 340/456 |
| 39 29 268 | 3/1991 | Germany | 340/456 |
| 296 06 501 | 8/1996 | Germany | 340/456 |
| WO 92/13215 | 8/1992 | WIPO | 340/456 |

*Primary Examiner*—Jeffery A. Hofsass
*Assistant Examiner*—Van T. Trieu
*Attorney, Agent, or Firm*—Evenson, McKeown, Edwards & Lenahan, PLLC

[57] ABSTRACT

A selecting arrangement having a display device, particularly for a motor vehicle, is described by which, by the deflection of a control element which is automatically restored for certain deflecting directions, particularly of a selector lever, a currently selected operating position and additional, optionally selectable operating positions, of a unit which can be controlled into several operating positions, particularly a motor vehicle transmission, are displayed. The currently selected operating position and the resulting shifting possibilities into additional, not selected operating positions are always displayed. More operating positions of the unit are adjustable than there are deflecting directions for the control element. The display of the currently selected operating position and the display of each individual additional selectable operating position are always displayed at the same point of the display device. The control element for selecting one defined operating position respectively must in each case always be deflected in the same direction.

18 Claims, 3 Drawing Sheets

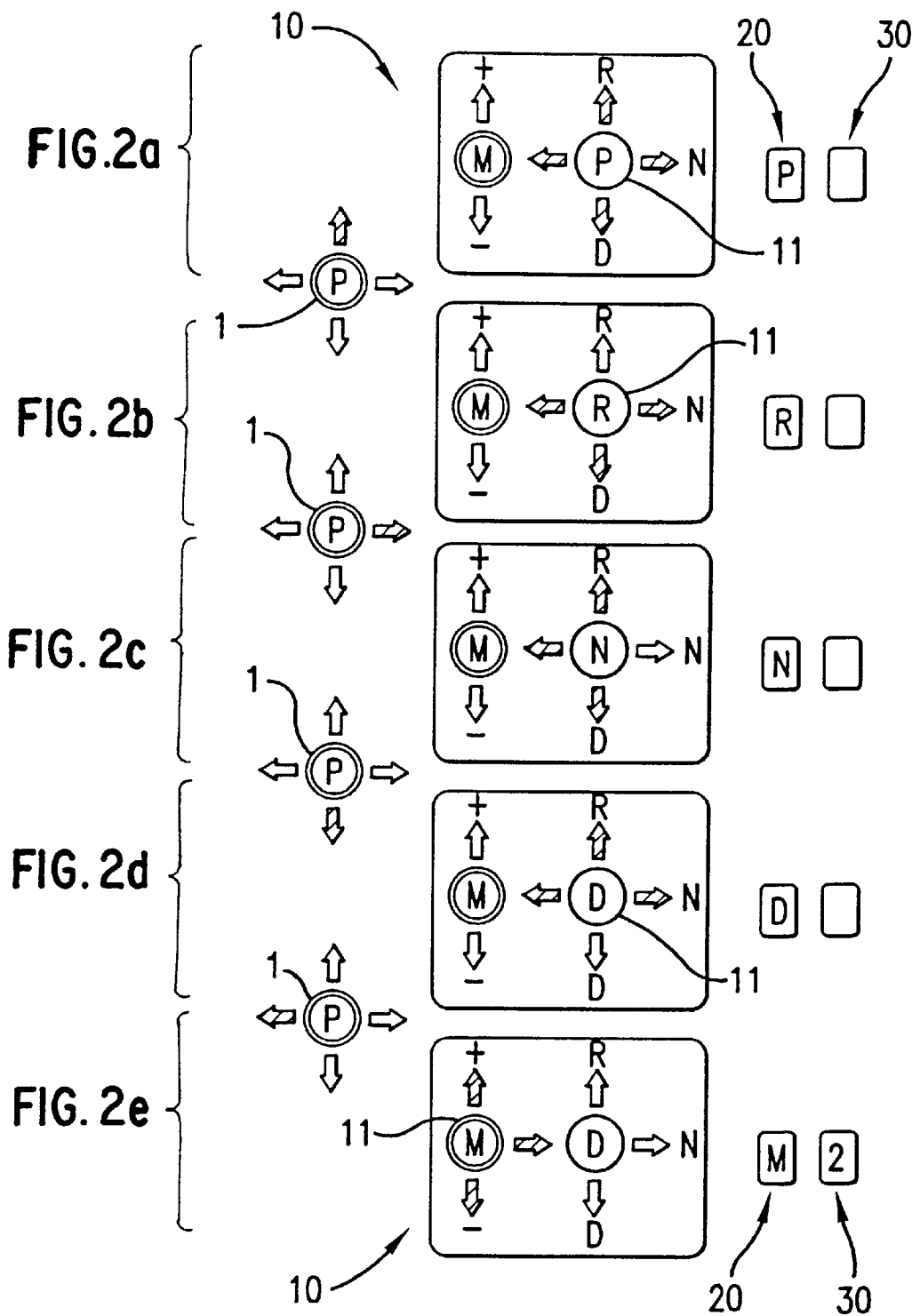

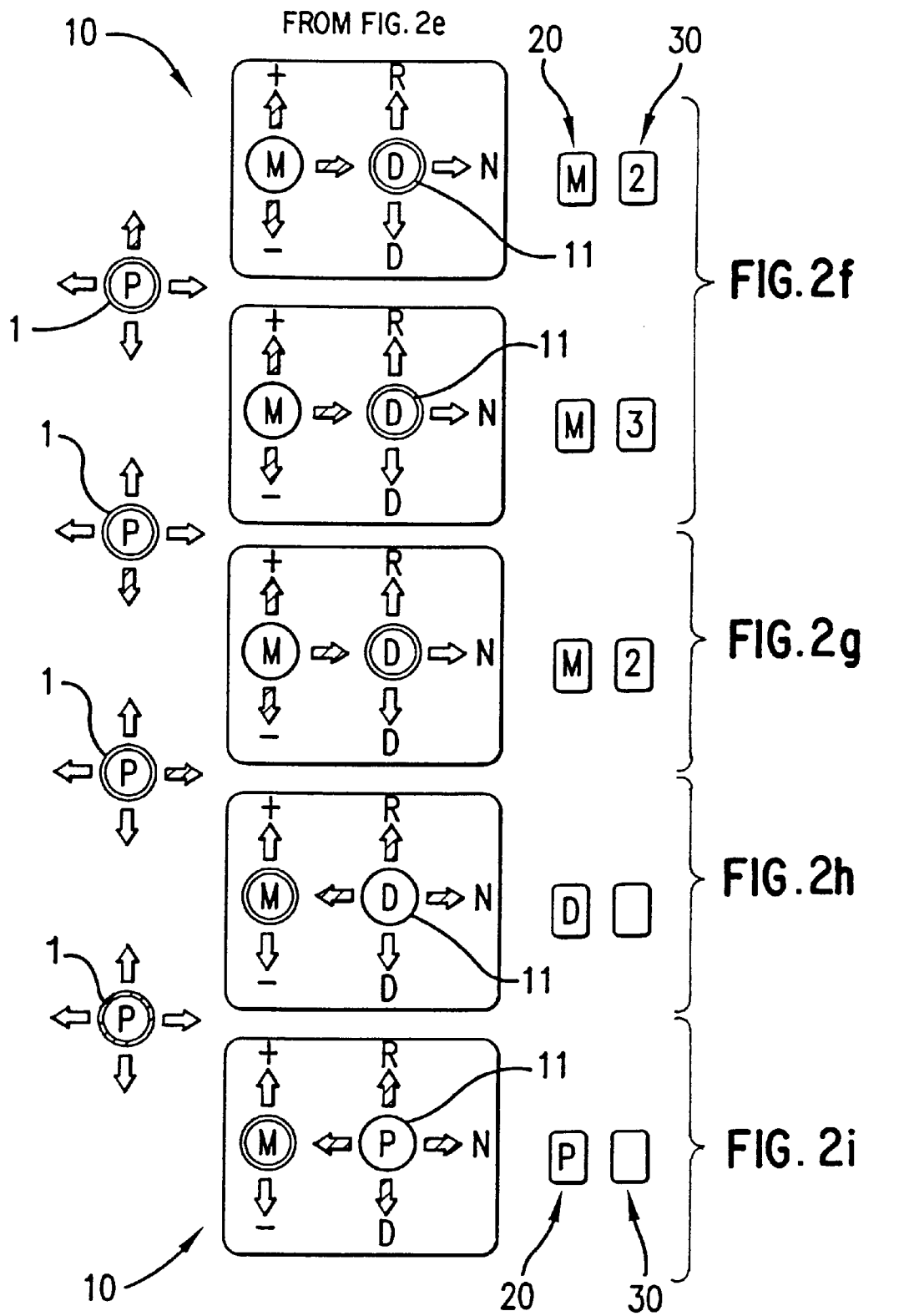

SELECTING ARRANGEMENT HAVING A DISPLAY DEVICE

BACKGROUND AND SUMMARY OF THE INVENTION

This application claims the priority of German Application No. 197 14 495.0, filed Apr. 8, 1996, the disclosure of which is expressly incorporated by reference herein.

The invention relates to a selecting arrangement having a display device, particularly for displaying the operating positions of a selector lever of a motor vehicle transmission. By the deflection of a control element which is automatically restored for certain deflecting directions, particularly of a selector lever, a currently selected operating position and additional, optionally selectable operating positions, of a unit which can be controlled into several operating positions, particularly of a motor vehicle transmission, are displayed such that the currently selected operating position and the resulting shifting possibilities into additional, non-selected operating positions are always displayed. More operating positions of the unit are adjustable than there are deflecting directions for the control element.

German Patent document DE 39 29 268 A1 describes a known selecting arrangement having a display device, in which case the image of the gear speed display changes as a function of the selected gear position.

In order to achieve the objective of the driver clearly and rapidly recognizing the shifting possibilities offered to him in the case of each selected gear position, it was found that it is not sufficient that the image of the gear speed display changes as a function of the selected gear position.

Particularly when the driver must recognize the engaged gear speed on the image of the gear speed display in this manner and must simultaneously also recognize the shifting possibilities, he must, before shifting, frequently check the display as to which movement of the selector lever will now engage the desired gear position since the shifting possibilities differ for the same movement of the selector lever depending on the currently engaged gear position.

There is therefore needed a selecting arrangement having a display device, particularly for a motor vehicle transmission, which displays to the driver the selecting direction for the desired gear position but also makes it possible for him to easily find it without looking at the display.

According to the invention, these needs are met by a selecting arrangement having a display device, particularly for a motor vehicle. By the deflection of a control element which is automatically restored for certain deflecting directions, particularly of a selector lever, a currently selected operating position and additional, optionally selectable operating positions, of a unit which can be controlled into several operating positions, particularly of a motor vehicle transmission, are displayed such that the currently selected operating position and the resulting shifting possibilities into additional, non-selected operating positions are always displayed. More operating positions of the unit are adjustable than there are deflecting directions for the control element. The display of the currently selected operating position and the display of each individual additional selectable operating position are always displayed at the same point of the display device. The control element for selecting one defined operating position respectively must in each case always be deflected in the same direction. Additional embodiments of the invention are described herein.

This has the advantage that, in the case of a self-restoring control element, which does not display the engaged operating position by its position, the driver can very easily learn the deflecting directions for the individual optionally selectable operating positions because they do not change.

In an advantageous embodiment of the invention, the display of the deflecting direction for selecting the already selected operating position is visually displayed differently than the display of the deflecting directions for the non-selected operating positions.

This has the advantage that the display device shows even more clearly which operating position is just being selected.

In another advantageous embodiment of the invention, the display device has at least two mutually spatially independent display fields.

Thus, as required, the additional display field can display additional information, or the information and/or the additional information can be presented at a different point.

In a preferred embodiment of the invention, the control element can be switched back and forth between at least two different actuating positions and, restoring itself automatically, can be moved from these actuating positions, into the additional deflecting directions.

In this manner, three new operating positions to be selected can be added for each additionally possible actuating position of the control element. In this case, only the display device must be enlarged by the display of the newly added actuating position with its operating positions so that, in each case, all operating positions can always be displayed at the same points. Thus, innumerable operating positions, each in the same direction respectively, can be selected by means of one automatically restoring control element. These operating positions are always displayed at the same points in the display device.

In another preferred embodiment of the invention, the display of the operating positions of at least one actuating position of the control element is displayed by a display field which is spatially independent of the display field which displays at least the different actuating positions.

This has the advantage that several operating positions can be displayed which can be selected successively from the same actuating position by moving the control element in the same direction.

If, in the case of a selecting arrangement with a display device, one actuating position of the control element is the starting position of the selector lever of an automatic transmission in a step shifting operating mode and another actuating position of the control element is the starting position of the selector lever of the automatic transmission in the automatic gear position operating mode, this has the advantage that, for an automatic transmission with a manually operable step shifting device, an operating guide is provided to the driver which is easy to learn.

Other objects, advantages and novel features of the present invention will become apparent from the following detailed description of the invention when considered in conjunction with the accompanying drawings.

BRIEF DESCRIPTION OF THE DRAWINGS

FIGS. 2a–i are different individual display images of a display device for a selector lever corresponding to FIG. 1, having three display fields and an assigned outlined selector lever movement. The lower display image FIG. 2e is continued on the drawing sheet having FIGS. 2f–i.

DETAILED DESCRIPTION OF THE DRAWINGS

Figure 1:
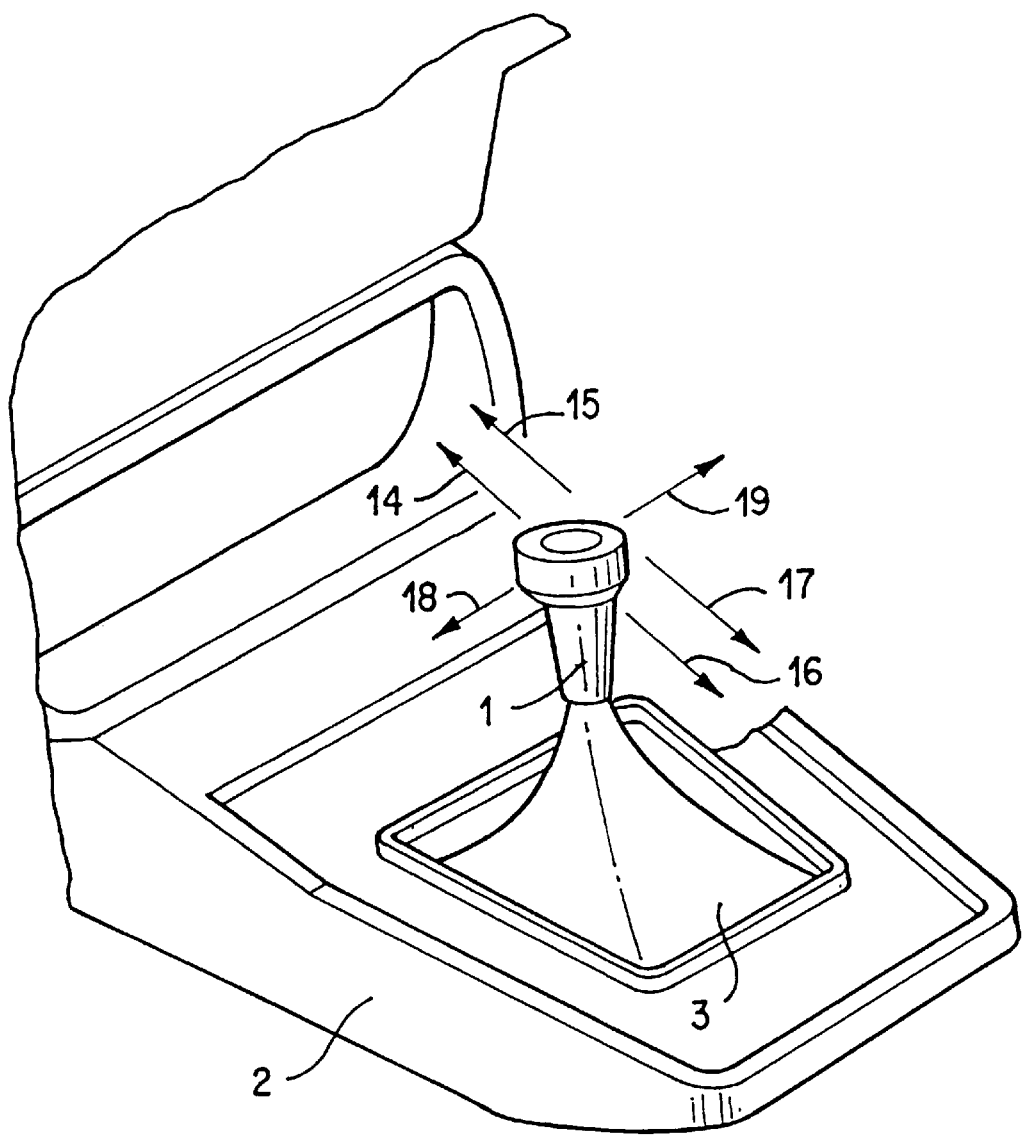
FIG. 1 is a schematic view of a selector lever, which is automatically restored from its actuating positions, on the center console of a motor vehicle having two actuating positions situated side-by-side in the transverse direction.

According to FIG. 1, a selector lever 1 is disposed on a center console 2 of a motor vehicle (which is not shown in detail). The selector lever 1 is used as a selecting arrangement for engaging individual gear positions of a motor vehicle transmission and, for this purpose, has on its lower end electric contacts which cannot be seen because of a covering sleeve 3. By closing the contacts when the selector lever 1 is actuated, shifting commands are emitted to an analysis circuit. The analysis circuit is not the object of the invention and is therefore not shown or explained in detail. It should only be mentioned in this respect that it can easily be constructed by a person skilled in the art and preferably contains a microcomputer. It has the purpose of triggering adjusting elements for a vehicle transmission which is also not shown. On the other hand, it determines a display image of a display device for a gear display within the driver's field of vision (which is not shown in FIG. 1).

The selector lever 1 can be displaced in two parallel actuating planes and in one actuating plane which is arranged perpendicularly thereto. Four directions are obtained in this case which are marked in FIG. 1 by corresponding arrows. The six arrows 14, 15, 16, 17, 18, 19 each show a possible movement for the selector lever 1 for selecting a new operating position of an automatic transmission for the step shifting operating mode and the automatic gear position operating mode. In order to reach six selectable operating positions with four possible moving directions, two different actuating positions in the longitudinal direction of the vehicle are required for the selector lever 1. One actuating position marked by the arrows 14 and 16 is that for the step shifting operation mode. The other actuating position-arrows 15 and 17—is the starting position of the selector lever 1 of the automatic transmission in the automatic gear position operating mode. Between these two actuating positions, the selector lever 1 can be shifted back and forth in the transverse direction (direction of arrows 18, 19).

In the step shifting operating mode, the individual gear speeds can be upshifted manually by moving the selector lever 1 in the direction of the arrow 14 and can be downshifted by a movement in the direction of the arrow 16. In this case, the selector lever 1 always automatically restores itself into its actuating position for the step shifting operation. The other actuating position of the selector lever 1 in which it can be brought in the direction of the arrow 19 by moving in the transverse direction of the vehicle, is that for the automatic gear position operating mode. The deflecting directions in this actuating position are illustrated in the longitudinal direction of the vehicle by the arrows 15 and 17. When the selector lever 1 is deflected in the direction of the arrow 15, the gear position R is engaged for the reverse driving operation; when the selector lever 1 is moved in the direction of the arrow 17, the gear position D for the forward driving operation is engaged.

From the actuating position for the automatic gear position operating mode, the selector lever 1 can, in addition, also be moved in the transverse direction of the vehicle in the direction of the arrow 19. The movement selects the operating position N-neutral; that is the vehicle stands still because the power flux in the transmission line is interrupted. Also in the automatic gear position operating mode, the selector lever 1 will automatically restore itself after a movement in the direction of the arrows 15, 19 or 17. The movement of the selector lever 1 in the transverse direction of the vehicle in the direction of the arrow 18 causes the switch-over from the automatic gear position operating mode to the step shifting operating mode.

By means of the analysis circuit, which is not shown, a display device is controlled which is mounted in the driver's field of vision and which displays the operating position currently selected by the selector lever 1 as well as the additional, optionally selectable operating positions of the motor vehicle transmission. In this case, more operating positions of the motor vehicle transmission can be adjusted than there are deflecting directions for the control element, i.e., the selector lever 1. Furthermore, the display of each individual, non-selected operating position is always shown at the same point of the display device. When a new operating position is selected by the selector lever 1, this selector lever 1 is in each case deflected for a defined operating position always in the same direction.

This is illustrated in FIGS. 2a–i by means of nine different display images of the display device in the driver's field of vision (FIGS. 2a–i). For a clearer representation, the selector lever 1 is shown in its respective actuating position schematically in the left column of FIGS. 2a–i, with the possible moving directions for selecting another operating position indicated by four arrows. In this case, the directional arrow in which the selector lever 1 is moved for selecting a new operating position is filled in in black in order to obtain the next display image of the adjacent column which is situated underneath.

This respective pertaining display image in the display field 10 of the display device is illustrated in the second column of FIG. 2. In this case, the display image above the respective selector lever 1 from the left column shows the operating position before the shifting movement is carried out and the display image underneath is that of the newly selected operating position after its selecting movement. The two columns still farther on the right each show another display field 20 and an additional display field 30 which are spatially independent of the display field 10 which displays the different actuating positions. The other display field 20 shows the individual gear steps of the automatic gear position operating mode when the selector lever 1 is in the actuating position for the automatic gear position. When it is in the actuating position for the step shifting operating mode, the other display field 20 shows this actuating position by means of the letter M for manual.

The additional display field 30 shows in the actuating position step shifting operation by means of the corresponding number the respectively engaged gear. When the selector lever 1 is in the automatic gear position operating mode, no display image is visible in the additional display field 30.

In the first display image of the display field 10—FIG. 2a, from the top-, it is shown that the motor vehicle transmission is in the automatic gear position actuating position with the selected operating position being gear position P (park). In the display image, the selector lever 1 is indicated by a circle 11 in whose center the engaged gear position is displayed by means of the letter P, while the arrows laid out in black show the possible moving directions for the selector lever 1 at whose arrow tips the respective gear position is shown which is selected when the selector lever 1 is moved in the direction of the respective arrow. Thus, from the selected operating position P, either R (reverse), D (drive), N (neutral) or M (manual operation) can be engaged. In this case, the swivelling of the selector lever to the left in the direction of the display M indicates the engaging of the step shifting operating mode in the other actuating position.

As shown by the first column, the selector lever 1 is now moved in the direction of the arrow filled in in black in the upward direction, for selecting R—the reverse gear position (display field 10). In the second display image of the display field 10 (FIG. 2b), the now engaged gear position R is indicated in the circle 11, while simultaneously the arrow in the direction R is visually represented differently because a selecting of the reverse gear position does not make much sense while the reverse gear position is already engaged. This visually changed representation is indicated in the drawing of the display field 10 by an arrow which is not filled in in the direction R, which can be implemented in the same manner in the case of the display image, for example, by an illumination of the arrow in a different color. In the additional display field 20, the display also changes from P—the parking position—to R—the reverse gear position. Since the selector lever 1 is not in the actuating position for the step shifting operating mode, no display becomes visible in the additional display field 30.

The moving of the selector lever 1 to the right in the second image of the first column indicated by the blackened arrow to the right, engages the next gear position N. This has the result that in the display field 10 (FIG. 2c—third image from the top) in the center of the circle 11 and in the additional display field 20 "N" is displayed. Now the neutral gear position is engaged. As a result, the arrow in the direction N is shown in a visually changed manner and the arrow in the direction R will again have its original appearance.

During the next movement of the selector lever 1 in the downward direction—direction D–, the forward drive gear position is engaged. As shown in FIG. 2d, in the circle 11 in the display image of the display field 10 and in the additional display field 20, the representation D will appear. The arrow in the direction D in the display image of the display field 10 is shown in a visually changed manner.

A swivelling of the selector lever 1 from the actuating position for the automatic gear position operating mode into the actuating position for the step shifting operating mode to the left causes all selection possibilities in the actuating position for the automatic gear position operating mode to appear in a visually changed manner because these are no longer selectable (FIG. 2e—fifth image of the display field 10 from the top). Instead, the selecting possibilities are illustrated in the step shifting operating mode. In the additional display field 30, the gear position "2" engaged in the step shifting operating mode is displayed. In the display field 20, M indicates that the step shifting operation was selected. In circle 11, which has changed its position to the left into the step shifting operating mode, it is indicated by means of M that a manual shifting is possible in the step shifting operation. During the change between the operating modes, in the step shifting operating mode precisely the same gear speed is taken over which was engaged in the automatic gear position operating mode.

In the downward direction, FIG. 2e is continued by the drawing sheet containing FIGS. 2e–i. For better clarity, the fifth image of FIG. 2e is again shown at the top of the next drawing page.

When, as illustrated in FIG. 2f, first column, the selector lever 1 is moved in the direction of the blackened arrow in the upward direction to "+" (display field 10), the next higher gear is engaged in the vehicle transmission. In the display image of display field 10 and in that of the additional display field 20, nothing is changed, but the additional display field 30 shows "3" for the third gear (second image of the display fields 10, 20, 30 from the top in FIG. 3). If one now wanted to manually upshift further, the selector lever 1 would simply have to be swivelled in the same manner in the direction "+".

During the swivelling of the selector lever 1 in the direction "–", the second gear is engaged again which, in the additional display field 30, is indicated by a "2", as illustrated by FIG. 2g (the third image of the display fields 10, 20, 30).

The actuating position for the selector lever 1 in the automatic gear position operating mode is achieved again when the selector lever 1 is swivelled to the right. As a result, the circle 11, as an indication of the position of the selector lever 1 in the display image of the display field 10 again moves farther to the right and the selecting possibilities in this operating mode are again shown by the underlaid arrows, while the arrows in the step shifting operating mode are visually indicated such that the display image of the display field 10 does not show a possibility of a selection (FIG. 2h). The circle 11 of the display image of the display field 10 and the display of the additional display field 20 show the now selected operating gear position D. The display of a gear position in the additional display field 30 is now no longer necessary (FIG. 2h—fourth image of the display fields 10, 20, 30 from the top).

As the next operating position, the operating position P is to be selected now in the automatic gear position operating mode. This is not possible by the movement of the selector lever 1 into just any direction but, as indicated in Column 1 on the selector lever 1, is drawn by the visual bolding of the display P by way of a different switch. This switch may, for example, be additionally mounted on the selector lever 1. Or the engaging takes place automatically by turning an ignition key in the ignition lock. If, for example, P is engaged at the selector lever 1, the display image of the display field 10 in the circle 11 will change to P, as in the additional display field 20 (FIG. 2i—fifth image of the display fields 10, 20, 30, from the top)

The different display images indicated in FIGS. 2a–i in the downward direction represent only a selection and have the purpose of explaining the principle of the display device in connection with the selecting arrangement. In this case, it is illustrated that the display device is constructed such that the display of the currently selected operating position and the display of each individual additional selectable operating position is always shown at the same point of the display device. Furthermore, the control element—the selector lever 1—must, for selecting a respective defined operating position, always be deflected in the same direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selecting arrangement for a motor vehicle, comprising:
    a deflectable control element which is automatically restored for certain deflecting directions, a currently selected operating position and additional, optionally selectable operating positions of a unit controllable into several operating positions are selected by the deflections of the control element;

a display device which displays said currently selected operating position and said additional, optionally selectable operating positions such that said currently selected operating position and shifting possibilities into additional, non-selected operating positions are always displayed, there being more operating positions of the unit that are adjustable than there are said certain deflecting directions of the control element;

wherein said display device arranges a display of said currently selected operating position and a display of each individual additional optionally selectable operating position at a same point on said display device regardless of the currently selected operating position; and wherein said control element must always be deflected in the same direction for selecting a particular one of said several operating positions regardless of the currently selected operating position.

2. Selecting arrangement according to claim 1, wherein a display of the deflecting direction for selecting the already selected operating position is visually indicated differently than the display of the deflecting directions for the non-selected operating positions.

3. Selecting arrangement according to claim 2, wherein the display device has at least two mutually spatially independent display fields.

4. Selecting arrangement according to claim 2, wherein the control element is switchable back and forth between at least two different actuating positions and, from said two different actuating positions, while automatically restoring itself, is movable into the additional, optionally selectable operating directions.

5. Selecting arrangement according to claim 1, wherein the display device has at least two mutually spatially independent display fields.

6. Selecting arrangement according to claim 5, wherein the control element is switchable back and forth between at least two different actuating positions and, from said two different actuating positions, while automatically restoring itself, is movable into the additional, optionally selectable operating directions.

7. Selecting arrangement according to claim 1, wherein the control element is switchable back and forth between at least two different actuating positions and, from said two different actuating positions, while automatically restoring itself, is movable into the additional, optionally selectable operating directions.

8. Selecting arrangement according to claim 7, wherein the display of the operating positions of at least one actuating position of the control element is displayed by the display field which is spatially independent of the display field which displays the different actuating positions.

9. Selecting arrangement according to claim 8, wherein an actuating position of the control element is the starting position of the selector lever of an automatic transmission in a step shifting operating mode.

10. Selecting arrangement according to claim 8, wherein another actuating position of the control element is the starting position of the selector lever of the automatic transmission in the automatic gear position operating mode.

11. Selecting arrangement according to claim 7, wherein an actuating position of the control element is the starting position of the selector lever of an automatic transmission in a step shifting operating mode.

12. Selecting arrangement according to claim 11, wherein another actuating position of the control element is the starting position of the selector lever of the automatic transmission in the automatic gear position operating mode.

13. Selecting arrangement according to claim 7, wherein another actuating position of the control element is the starting position of the selector lever of the automatic transmission in the automatic gear position operating mode.

14. A display device for displaying selections of a unit controllable into several operating positions via a control element, comprising:

a first display field in which is always displayed at a same point a currently selected operating position and each individual additional optionally selectable operating positions, a greater number of operating positions of the unit being adjustable than there are deflecting directions of the control element for selecting said operating positions; and wherein for each individual additional optionally selectable operating position, the control element is, in each case, always deflected in a same direction.

15. The display device according to claim 14, wherein said first field includes a display of deflecting directions for selecting said operating positions, a deflecting direction of the currently selected operating position being visually indicated differently than deflecting directions for said additional, optionally selectable operating positions.

16. The display device according to claim 14, further comprising a second display field spatially independent from said first display field.

17. The display device according to claim 16, wherein a display of operating positions of at least one actuating position of the control element is displayed by the second display field which is spatially independent of the first display field displaying the different actuating positions.

18. The display device according to claim 14, wherein said display device is a motor vehicle display device and said unit is a motor vehicle transmission.

* * * * *